(12) United States Patent
Chen et al.

(10) Patent No.: US 8,707,246 B2
(45) Date of Patent: Apr. 22, 2014

(54) ENGINEERING PROJECT EVENT-DRIVEN SOCIAL NETWORKED COLLABORATION

(75) Inventors: Xiaozheng Chen, Shanghai (CN); Min Li, Shanghai (CN); (Jason) Jingcun Wang, Shanghai (CN); Lamar Damata, San Diego, CA (US)

(73) Assignee: Microsoft Corporation, Redmond, WA (US)

( * ) Notice: Subject to any disclaimer, the term of this patent is extended or adjusted under 35 U.S.C. 154(b) by 440 days.

(21) Appl. No.: 13/017,010

(22) Filed: Jan. 30, 2011

(65) Prior Publication Data

US 2012/0198414 A1 Aug. 2, 2012

(51) Int. Cl.
*G06F 9/44* (2006.01)

(52) U.S. Cl.
USPC ............................ 717/102; 717/101; 717/120

(58) Field of Classification Search
None
See application file for complete search history.

(56) References Cited

U.S. PATENT DOCUMENTS

| | | | |
|---|---|---|---|
| 5,513,315 A * | 4/1996 | Tierney et al. | 714/37 |
| 6,408,309 B1 * | 6/2002 | Agarwal | 707/999.104 |
| 8,019,632 B2 * | 9/2011 | Niheu et al. | 717/102 |
| 8,024,700 B2 * | 9/2011 | Cantor et al. | 717/120 |
| 8,069,433 B2 * | 11/2011 | Parsell et al. | 717/102 |
| 8,145,678 B2 * | 3/2012 | Ramsay et al. | 707/802 |
| 8,285,787 B2 * | 10/2012 | Ferris et al. | 717/101 |
| 8,402,425 B2 * | 3/2013 | Deb et al. | 717/101 |
| 8,464,206 B2 * | 6/2013 | Jenkins et al. | 717/120 |
| 8,473,902 B2 * | 6/2013 | Davies et al. | 717/120 |
| 8,499,280 B2 * | 7/2013 | Davies et al. | 717/120 |
| 8,549,481 B2 * | 10/2013 | Birsan et al. | 717/102 |
| 8,561,023 B2 * | 10/2013 | Abrams et al. | 717/120 |
| 8,584,079 B2 * | 11/2013 | Yassin et al. | 717/101 |
| 2004/0215793 A1 * | 10/2004 | Ryan et al. | 709/229 |
| 2007/0006041 A1 * | 1/2007 | Brunswig et al. | 714/38 |
| 2008/0086718 A1 * | 4/2008 | Bostick et al. | 717/120 |
| 2008/0134298 A1 * | 6/2008 | Nathan et al. | 717/101 |
| 2008/0195963 A1 * | 8/2008 | Eisen et al. | 715/772 |
| 2008/0288914 A1 * | 11/2008 | Schmitter | 717/101 |
| 2009/0198506 A1 | 8/2009 | Gupta | |
| 2009/0222448 A1 * | 9/2009 | Caldwell et al. | 707/9 |
| 2009/0222750 A1 | 9/2009 | Jain et al. | |
| 2009/0276263 A1 * | 11/2009 | Deb et al. | 705/7 |
| 2010/0070881 A1 | 3/2010 | Hanson et al. | |

(Continued)

OTHER PUBLICATIONS

Microsoft, Microsoft Computer Dictionary, 2002, Microsoft Press, Fifth Edition, (3 pages total).*

(Continued)

*Primary Examiner* — Thuy Dao
*Assistant Examiner* — Ravi K Sinha
(74) *Attorney, Agent, or Firm* — Kevin Sullivan; Kate Drakos; Micky Minhas (57) ABSTRACT

Engineering team activities are facilitated through social networked collaboration driven by engineering project events. An engineering team member profile on a private network contains an identification of the team member including an offline name, direct links to profiles of other team members, automatically generated news items of team member engineering activities, and a summarized view of engineering project data. A news generator automatically collects engineering events and includes corresponding event descriptions in the profile, for wiki article updates, software bug reports, software modifications, project schedule changes, and other engineering events. Some news items automatically include a suggested engineering activity as a follow up for the team member to perform. For example, the team member may click a news item link to view an updated product specification, create a product test, view detailed test results, or create a virtual machine session.

20 Claims, 4 Drawing Sheets

(56) References Cited

U.S. PATENT DOCUMENTS

| | | | | |
|---|---|---|---|---|
| 2010/0198757 | A1* | 8/2010 | Cheng et al. | 706/12 |
| 2010/0241611 | A1 | 9/2010 | Zuber | |
| 2010/0241971 | A1* | 9/2010 | Zuber | 715/753 |
| 2011/0214069 | A1* | 9/2011 | Jung et al. | 715/752 |
| 2011/0307862 | A1* | 12/2011 | Abrams et al. | 717/120 |
| 2012/0124549 | A1* | 5/2012 | Robinson | 717/102 |

OTHER PUBLICATIONS

Whitehead, J., Collaboration in Software Engineering: A Roadmap, [Online] 2007, Future of Software Engineering, May 23-25, 2007. FOSE '07, [Retrieved from the Internet] < http://ieeexplore.ieee.org/stamp/stamp.jsp?tp=&arnumber=4221622&isnumber=4221601> pp. 214-225.*

Lanubile et al., Collaboration Tools for Global Software Engineering, [Online] 2010, Software, IEEE, vol. 27, No. 2, Mar.-Apr. 2010, [Retrieved from the Internet] <http://ieeexplore.ieee.org/stamp/stamp.jsp?tp=&arnumber=5420797&isnumber=5420782> pp. 52-55.*

Gillet et al., Turning Web 2.0 Social Software into Versatile Collaborative Learning Solutions, [Online] Feb. 2008, Advances in Computer-Human Interaction, 2008 First International Conference on, [Retrieved from the Internet] <http://ieeexplore.ieee.org/stamp/stamp.jsp?tp=&arnumber=4455977&isnumber=4455943> pp. 170-176.*

Chao, J., Student Project Collaboration Using Wikis, [Online] 2007, Software Engineering Education & Training, Jul. 3-5, 2007. CSEET '07. 20th Conference on, [Retrieved from the Internet] < http://ieeexplore.ieee.org/stamp/stamp.jsp?tp=&arnumber=4271613&isnumber=4271572> pp. 255-261.*

Bafoutsou; Georgia, Mentzas; Gregoris, Review and Functional Classification of Collaborative Systems, [Online] 2002, International Journal of Information Management 2002, [Retrieved from the Internet] <http://ac.els-cdn.com/S0268401202000130/1-s2.0-S0268401202000130-main.pdf?_tid=28459028-8f33-11e3-abb1-00000aacb35f&acdnat=1391693743_> pp. 281-305.*

"Team Collaboration ~ HootSuite Releases Tools for Agencies and Groups", Retrieved at << http://blog.hootsuite.com/team-collaboration/ >>, Apr. 13, 2010, pp. 14.

Bram, Thursday., "Collaborating With Your Organization's Social Network Using Saba Live", Retrieved at << http://gigaom.com/collaboration/collaborating-with-your-organizations-social-network-using-saba-live/ >>, Oct. 4, 2010, pp. 7.

Buczek, et al., "Developing an Enterprise Social Computing Strategy", Retrieved at << http://download.intel.com/it/pdf/Developing_an_Enterprise_Social_Computing_strategy.pdf >>, White Paper, Jul. 2009, pp. 12.

Alto, Paul., "Socialtext Delivers Socialtext 4.0", Retrieved at << http://www.socialtext.com/news/pressrelease_2010.03.03.php >>, Mar. 3, 2010, pp. 2.

"Active Directory", Retrieved at << http://en.wikipedia.org/wiki/Active_Directory >>, Nov. 16, 2010, pp. 9.

"Facebook", Retrieved at << http://en.wikipedia.org/wiki/Facebook >>, Nov. 17, 2010, pp. 15.

"Microsoft SharePoint", Retrieved at << http://en.wikipedia.org/wiki/Microsoft_SharePoint >>, Nov. 11, 2010, pp. 4.

"Microsoft Visual SourceSafe", Retrieved at << http://en.wikipedia.org/wiki/Microsoft_Visual_SourceSafe >>, Nov. 12, 2010, pp. 5.

"Product Studio", Retrieved at << http://social.msdn.microsoft.com/forums/en-US/tfsgeneral/thread/9e0288f2-642a-46a4-a9e0-e27c13d32161 >>, Jul. 2005, pp. 2.

"Social network service", Retrieved at << http://en.wikipedia.org/wiki/Social_network_service , Nov. 17, 2010, pp. 13.

"Socialtext Brings the Twitter Annotations Spec into the Enterprise", Retrieved at << http://www.readwriteweb.com/enterprise/2010/06/socialtext-brings-the-twitter.php >>, 1Jun. 17, 2010, pp. 3.

"Socialtext Deepens Integration with SharePoint", Retrieved at << http://www.cmswire.com/cms/enterprise-20/ socialtext-deepens-integration-with-sharepoint-008006.php >>, Jul. 9, 2010, pp. 3.

"User profile", Retrieved at >> http://en.wikipedia.org/wiki/User_profile >>, Oct. 26, 2010, pp. 3.

"Virtual Machine Manager FAQ", Retrieved at << http://technet.microsoft.com/en-us/library/bb740760.aspx#AboutVMM >>, Retrieval Date Nov. 16, 2010, pp. 2.

* cited by examiner

ENGINEERING PROJECT EVENT-DRIVEN SOCIAL NETWORKED COLLABORATION

BACKGROUND

An online social network uses computer technology to help build and document social relations among people who share interests and/or activities. Social networks can facilitate communication between a large number of people. Some of the most popular social networks have tens of millions of users; the FaceBook® social network service (mark of FaceBook, Inc.) has over five hundred million registered users. It is not unusual for an individual user to have direct links in a social network to hundreds or even thousands of other users.

A social network often includes a representation of each user, such as a profile created by the user, containing self-provided information, information posted by other users, and links to other users who are "friends" of the profiled user. Users can upload pictures, post blog entries, search for other users with similar interests, and create and share contact lists. Many social network services are web based, allowing users to communicate with each other over the internet through postings, email, and instant messaging. To help protect user privacy, social networks often have controls that allow users to choose who can view their profile, who can contact them, who can add them to a list of contacts, and so on, but communications between users are not necessarily encrypted or otherwise protected as a result.

SUMMARY

Engineers use public social network services in their daily lives to communicate with friends about hobbies, sports, music, movies, and other recreational topics. However, in their workplaces engineers continue to rely on traditional toolsets to communicate and collaborate with teammates, even when such traditional tools are isolated and involve extra time and knowledge for use, thereby increasing engineering collaboration overhead, because satisfactory alternatives have not been available.

Some embodiments described herein provide or facilitate social networked collaboration which is driven by engineering project events. An engineering team member can have a profile containing components such as an identification of the team member, direct links to profiles of other team members, automatically generated news items of engineering activities of team members, and a summarized view of engineering project data for the engineering team. Although familiar social networking technology can be adapted for such use, several differences may be present.

In some embodiments, for example, the identification of a member of an engineering team includes an offline name of the team member, that is, a name which is used by the team member in social interactions offline with people who are not members of the engineering team. The offline name differs from a typical online username, since usernames can provide anonymity but the offline name cannot. Similarly, the offline name includes the member's legal name or a clear derivation thereof (e.g., a nickname, an Anglicized version, or a shortened form), whereas a username need not be derived from a user's legal name. Team members may also be identified by employer in their profile and/or in news items.

In some embodiments, a news generator automatically collects engineering events from engineering data sources and makes corresponding event descriptions available for inclusion in the profile. In some, the personalized real time news items include a suggested engineering activity for the team member to perform as part of an engineering project of the engineering team. In some, the profile includes a test report describing engineering test activity for an engineering project of the engineering team, and in some the profile includes a personalized engineering task prioritization for engineering tasks of the team member.

In some embodiments, the personalized real time news items of engineering team activities include items such as a project schedule update for an engineering project of the team, a notification regarding an engineering task assigned to the team member, and/or software modification event updates for a software engineering project of the team.

In some embodiments, an automatically suggested engineering activity indicates a follow-up activity by the team member, such as performing a computer-assisted engineering project task. For example, the team member may follow up on a specification news item by viewing a product specification or by creating a product test, may follow up on a test execution news item by viewing detailed test results, and may follow up on a developer investigation news item by creating a virtual machine session.

Some embodiments are most conveniently viewed from a user's perspective, while some are viewed most conveniently from an implementation's perspective. From an implementation's perspective, for example, some embodiments involve automatically collecting engineering events from engineering data sources, and displaying a profile with an offline name of an engineering team member, direct links to profiles of other members of the engineering team, and personalized news items based on collected engineering events.

The collected engineering events may include, for example, wiki article updates, software bug reports, software modifications, project schedule changes, and/or other events from engineering data sources. The engineering data sources may include, for example, a network administration database, a software source control system, a project issue tracking tool, a test case management tool, a file sharing tool, a web publishing tool, and/or a virtual machine management tool.

More generally, although software engineering is used as an example herein, some embodiments may be used for social networked event-driven collaboration in other areas of engineering, such as agricultural engineering, aerospace engineering, biomedical engineering, civil engineering, computer engineering, electrical engineering, genetic engineering, materials engineering, mechanical engineering, mining engineering, nanotechnology engineering, petroleum engineering, and other recognized or hereafter developed branches of engineering.

From a user's perspective, some embodiments involve logging into a virtual private network (VPN) or other private network, accessing a social network platform which is unavailable outside the private network, and viewing engineering team news items in a profile on the private social network platform. The profile may be an individual profile for a member of an engineering team, or a team profile for the engineering team. Sometimes a member participates in a real-time multidirectional communication session (VoIP, chat, webcam, etc.) with at least one other member of the engineering team through the social network platform.

Unlike public social networks, some private social network platforms discussed herein are used solely by members of a given engineering team, or solely by employees of a given company. In some cases, accessing and viewing profiles is limited to members of the engineering team and all team members are employed by the same entity. In some cases, all product development members of the engineering team are employed by the same entity, and the engineering team further includes testing personnel employed by other entities which have confidentiality agreements with the product development entity.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

A social network based collaboration platform for engineering organizations is described. The platform provides engineering news update, team profiles, individual profiles, and engineering collaboration functionalities within news updates. Engineers can communicate and collaborate more efficiently with this platform.

Some embodiments described herein provide collaboration actions (suggested engineering activities) which help users follow up on engineering news items with workflows and best practices. Some provide news updates which present users with personalized real-time news items of engineering activities. Some provide profile pages which present a real-time summarized view of engineering data for individuals or teams from different data sources. Some include a news generator which automatically collects engineering news updates from various data sources in engineering workplaces. Some provide a social connection manager which allows users to configure connections with teams or teammates. Some provide a news summary which summarizes the engineering activities of an individual or team within a user-specified or predetermined time period.

Some embodiments described herein may be viewed in a broader context. For instance, concepts such as profiles, engineering teams, news, and private networks may be relevant to a particular embodiment. However, it does not follow from the availability of a broad context that exclusive rights are being sought herein for abstract ideas; they are not. Rather, the present disclosure is focused on providing appropriately specific embodiments. Other media, systems, and methods involving profiles, engineering teams, news, and private networks are outside the present scope. Accordingly, vagueness and accompanying proof problems are also avoided under a proper understanding of the present disclosure.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit. For example a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

"Private network" means a virtual private network or another computerized device network which is not accessible to the general public.

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine. However, "automatically" does not necessarily mean "immediately".

Throughout this document, use of the optional plural "(s)" means that one or more of the indicated feature is present. For example, "news item(s)" means "one or more news items" or equivalently "at least one news item".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as "accessing", "viewing", "deriving", "displaying", "collecting", "transmitting", "sending", "issuing", or "communicating" with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory thereby transforming it to a particular article, as opposed to simply existing on paper, in a person's mind, or as a signal on a wire, for example.

Operating Environments

Figure 1:
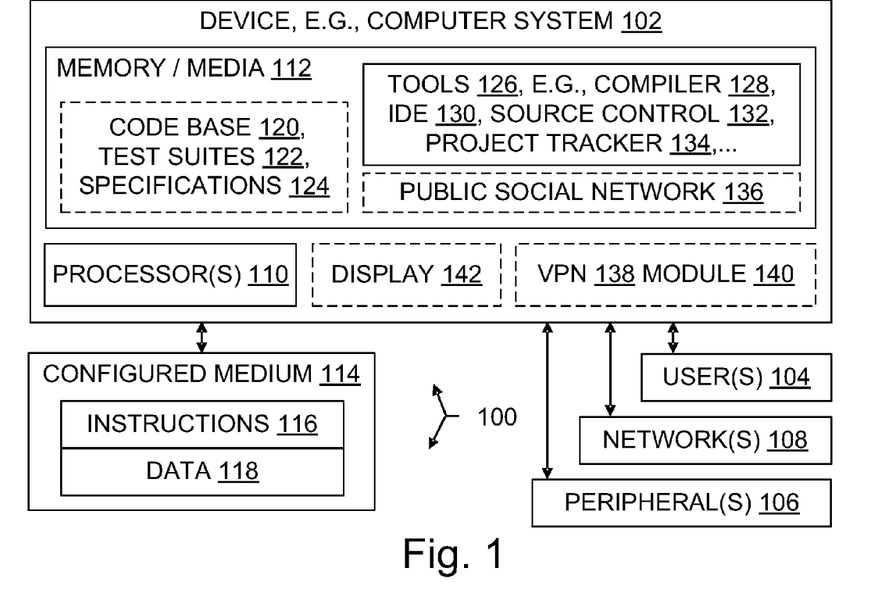
FIG. 1 is a block diagram illustrating a computer system having at least one processor, at least one memory, at least one tool for an engineering project, and other items in an operating environment which may be present on multiple network nodes, and also illustrating configured storage medium embodiments.

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked.

Human users 104 may interact with the computer system 102 by using displays, keyboards, and other peripherals 106. System administrators, project managers, developers, engineers, and other end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, and/or of other types of storage media (as opposed to media such as a wire that merely propagates a signal). In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by engineering event-driven social network collaboration as discussed herein, e.g., by linking, summarization, news item generation, prioritization, binding, deployment, execution, modification, display, creation, loading, and/or other operations.

Engineering project components and data such as a software project code base 120, test suites 122, and specifications 124, as well as traditional tools 126 such as compilers 128, integrated development environments 130, source control tools 132, and project tracking tools 134, other data and software, and other items shown in the Figures and/or discussed in the text may reside partially or entirely within one or more media 112, thereby configuring those media. A public social network 136 (which is not limited to a private network) may be present in the form of web pages, plug-ins, and the like. Access to a virtual private network (VPN) 138 for secure email or VoIP communication, for example, may be provided by a VPN module 140 using familiar VPN tools and techniques.

In addition to processor(s) 110 and memory 112, an operating environment may also include other hardware, such as a display 142, buses, power supplies, accelerators, numerically controlled equipment, robotic equipment, fabrication equipment, and/or diagnostic equipment, for instance.

As noted, a given operating environment 100 may include an Integrated Development Environment (IDE) 130 which provides a software developer with a set of coordinated software development tools. In particular, some of the suitable operating environments for some embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but teachings herein are applicable with a wide variety of programming languages, programming models, and programs, as well as with engineering endeavors outside the field of software development per se.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
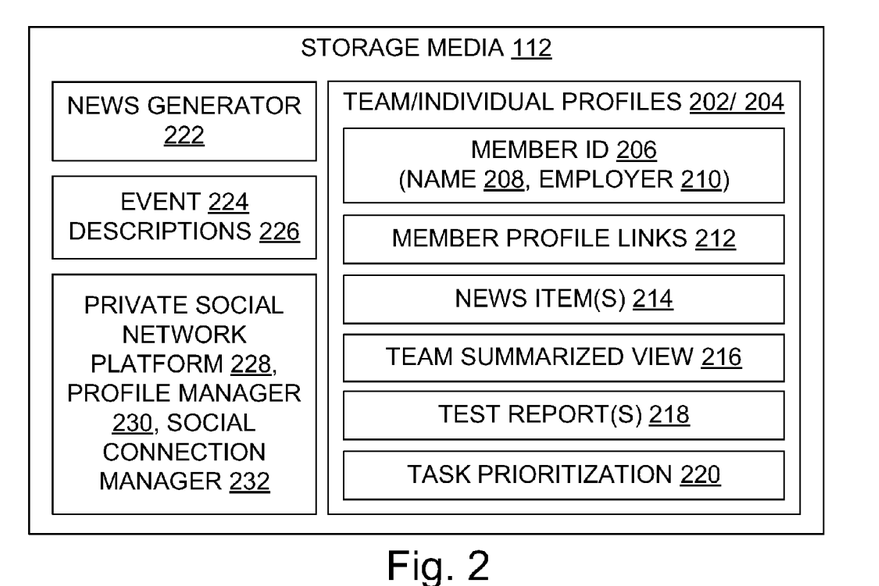
FIG. 2 is a block diagram illustrating an example architecture for social networked collaboration driven by events in an engineering project.

FIG. 2 illustrates an architecture which is suitable for use with some embodiments. Profiles (designated in FIG. 3 as profiles 336) in an embodiment may include engineering team profiles 202 and/or individual engineering team member profiles 204. Within a profile, a member identification 206 includes a member's name 208 and may also include the name of the member's employer 210.

In some embodiments, direct links 212 (e.g., hyperlinks) are provided to profiles of other members of the engineering team. In profiles 202, 204, links to non-team-members are generally not provided. In particular, in some embodiments the profiles are free of any links to public social networks, and in some embodiments the profiles are free of any links to profiles of people who are not on the profile owner's engineering team, even if those people have the same employer as the profile owner and/or even if those people have access to the private network that hosts the team member's profile.

In some embodiments, profiles 202/204 include personalized (team-specific) engineering news items 214. As discussed herein, news items 214 can be automatically generated from engineering data sources, such as engineering wikis, source code control systems, project management tools, and so on.

In some embodiments, profiles 202/204 include a team-specific summarized view 216 of engineering project activities and status. In some, the profiles 202/204 include engineering test reports 218. Although test reports 218 are shown for convenience in FIG. 2 in a block apart from the summarized view 216 block, it will be appreciated that the summarized view 216 may include test reports 218, as well as news items 214 and/or direct links 212.

In some embodiments, profiles 202/204 include a task prioritization 220, such as a list of bug reports, a project "hot list" or "action item" list, or other automatically generated prioritization.

Some embodiments include a news generator 222 which queries and/or monitors activity in engineering data sources. In response to engineering events 224 such as source code updates, task completions, test result logging, and other computer-assisted actions, some embodiments create descriptions 226 of the events 224. Descriptions 226 may include text with embedded hyperlinks to tool 126 interfaces, for example.

Some embodiments include a private social network platform 228, with a profile manager 230 and a social connection manager 232, for example. The profile manager 230 and social connection manager 232 can be adaptations of corresponding familiar public social network 136 components which are limited to profiles 202/204 and direct links 212 as discussed herein.

With reference to FIGS. 1 and 2, some embodiments provide a computer system 102 with a logical processor 110 and a memory medium 112 which is in operable communication with the logical processor and is configured by circuitry, firmware, and/or software to transform a collaborative project by providing engineering-event-driven private social networking functionality as described herein. A team profile 202 and/or an individual profile 204 residing in the memory has an identification 206 of a member 104 of an engineering team, has at least one direct link 212 to profile(s) of other member(s) of the engineering team, has automatically generated news items 214 of engineering activities of members of the engineering team, and has a summarized view 216 of engineering project data for the engineering team. Other embodiments contain a different set of the various components 206-220, in profiles and/or functionally associated with profiles 202, 204.

In some embodiments, the identification 206 of a member of an engineering team includes an offline name 208 of the team member. An example of such a name 208 is a name which is used by the team member in social interactions offline with people who are not members of the engineering team. Offline names are not mere conventional online user names, as they have different origins and different characteristics with respect to offline usage and anonymity, for example. Characteristics of offline names 208 are also discussed elsewhere herein.

In some embodiments, the news items 214 include personalized real time news items of engineering activities of the engineering team. Some examples of news items 214 include a project schedule update for an engineering project of the engineering team, a notification regarding an engineering task assigned to the team member, and software modification event updates for a software engineering project of the engineering team.

Figure 3:
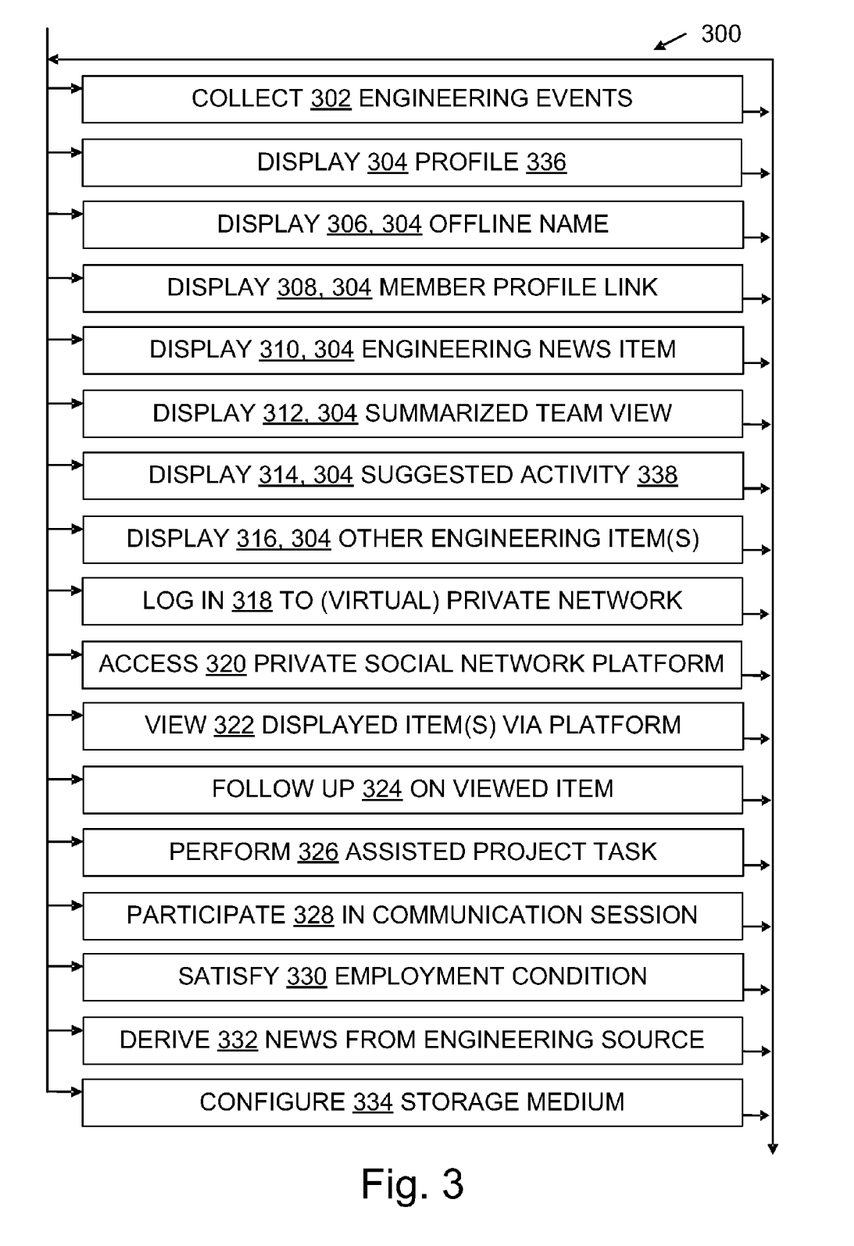
FIG. 3 is a flow chart illustrating steps of some process and configured storage medium embodiments.

In some embodiments, a news item 214 may include an activity suggestion, also referred to herein as a suggested activity and denoted at 338 in FIG. 3. Such a suggestion specifies a suggested engineering activity for the team member to perform as part of an engineering project of the engineering team, and may include a hyperlink or other linkage to a tool 126 with which the activity can be performed by the member.

In some embodiments, a profile may include a test report 218 describing engineering test activity for an engineering project of the engineering team. In some, a profile may include a personalized (individual- or team-specific) engineering task prioritization 220, such as an action item list of engineering tasks of the team member in an engineering project of the engineering team.

Some embodiments include code, scripts, parsers, scrapers, query generators, and/or other mechanisms of a news generator 222 which collects engineering events 224 from engineering data sources and makes corresponding event descriptions 226 available for inclusion in the profile.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. In particular, a VPN module 140 may provide access to a VPN which overlays a public network such as the internet. In some cases, an embodiment may also communicate through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment. For example, engineering events 224 may be on multiple devices/systems 102 in a networked cloud, news generator 222 code may be run from yet other devices within the cloud, and the profiles 202, 204 may configure the displays 142 on yet other cloud device(s)/system(s) 102.

Processes

FIG. 3 illustrates some process embodiments in a flowchart 300. Processes shown in the Figures may be performed in some embodiments automatically, e.g., by a news generator 222 and profile 202, 204 manager 230 requiring little or no direct human user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During an event collecting step 302, an embodiment collects engineering events 224 from engineering data sources. Step 302 may be accomplished using scripts, command line interfaces of tools 126, tool 126 log file parsers, database queries, and/or other mechanisms, for example.

During a profile displaying step 304, an embodiment displays a profile 336 by displaying a team profile 202 and/or an individual profile 204. Step 304 may be accomplished using familiar web interfaces, other graphical user interfaces (GUIs), browsers, render engines, and the like, adapted to display components 206-220 as described herein.

During an offline name displaying step 306, which may be part of profile displaying step 304, an embodiment displays an offline name 208 of a team member.

During a member profile link displaying step 308, which may be part of profile displaying step 304, an embodiment displays a link 212 to a profile 204 of a team member.

During an engineering news item displaying step 310, which may be part of profile displaying step 304, an embodiment displays an engineering news item 214 concerning a team member.

During a team view displaying step 312, which may be part of profile displaying step 304, an embodiment displays a summarized team view 216 of an engineering team.

During an activity suggestion displaying step 314, which may be part of profile displaying step 304, an embodiment displays a suggested activity 338 for a team member.

More generally, during a profile component displaying step 316, which may be part of profile displaying step 304, an embodiment displays a profile component such as a component 206-220 or any other component discussed herein, including without limitation a project schedule update, a notification regarding an assigned engineering task, a software modification update, an engineering wiki article update, or a bug report.

During a VPN logging in step 318, a member (or an embodiment acting on behalf of a member) logs into a virtual private network; this may be done using familiar login mechanisms, for example.

During a private social network platform accessing step 320, a member (or an embodiment acting on behalf of a member) accesses (reads and/or writes) a private social network platform 228; this may be done using familiar browsing, posting, or viewing mechanisms, for example, adapted from their familiar use of accessing public social networks 136. For example, a VPN or other private network login step 318 may be required before accessing 320 a private social network platform, and display 304 of engineering-event-driven information may be part of step 320.

During a viewing step 322, a user views information displayed 304 in a private social network platform 228, e.g., by seeing a profile 202, 204 or a printout of such as profile, or by listening to a synthesized or human reading of such information.

During a following up step 324, a user follows up on a viewed 322 item, particularly as viewed news item 214, by performing engineering activity in response to the viewed item.

In particular, during a task performing step 326 which may be part of following up 324, a user performs an assigned or self-initiated engineering project task with computer assistance, e.g., by using a computerized tool 126.

During a communication session participating step 328, a user (team member) participates in a communication session (e.g., chat, webcam, VoIP) with another team member using a tool accessed 320 through a viewed 322 item.

During an employment condition satisfying step 330, team members adhere to specified employment conditions.

During a news deriving step 332, an embodiment derives news items 214 from engineering data source events 224.

During a memory configuring step 334, a memory medium 112 is configured by a profile 336, a news generator 222, a private social network platform 228, and/or otherwise in connection with a engineering event-driven private social network collaboration as discussed herein.

Figure 4:
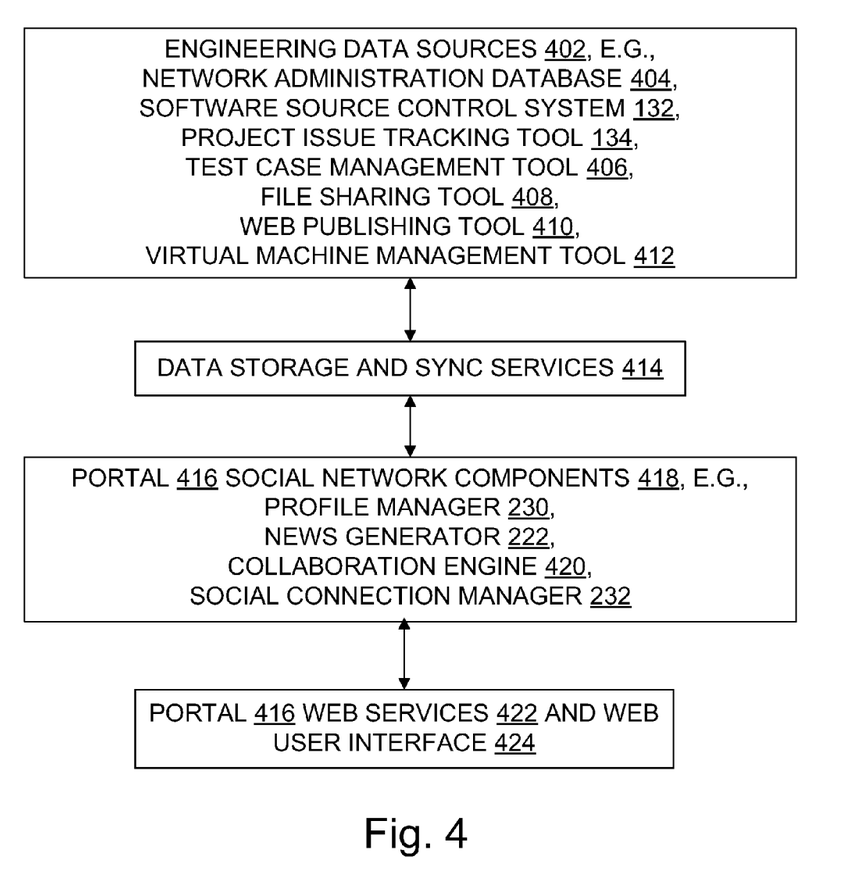
FIG. 4 is a data flow diagram illustrating social networked collaboration driven by events in an engineering project.

FIG. 4 further illustrates process and system aspects described above. The foregoing steps and components and their interrelationships are discussed in greater detail below, in connection with various embodiments, and with reference to FIGS. 1 through 4.

Some embodiments provide a process for engineering project event-driven social networked collaboration. The process includes collecting 302 engineering events from engineering data sources 402, and displaying 304 a profile. Displaying step 304 in this example includes displaying 306 an offline name of a member of an engineering team, displaying 308 direct links to profiles of other members of the engineering team, and displaying 310 personalized news items based on collected engineering events.

In some embodiments, collecting step 302 collects engineering events 224 of at least one of the following kinds: wiki article updates, software bug reports, software modifications, project schedule changes. In some, collecting step 302 collects engineering events from a number of the following sources 402: a network administration database 404, e.g., a Microsoft® Active Directory® database or other administration database; a software source control system, e.g., a Microsoft® Visual SourceSafe® system or other version control and/or revision control and/or source code control and/or configuration management system; a project issue tracking tool, e.g., a Microsoft® Visual Studio® Team System tool or other project issue tracking tool; a test case management tool 406; a file sharing tool, e.g., Microsoft® SharePoint® tool or other file sharing tool; a web publishing tool, e.g., Microsoft® SharePoint® tool or other web publishing tool; a virtual machine management tool, e.g., a Microsoft® Virtual Machine Manager tool or other virtual machine management tool. The number of sources 402 used in a given embodiment may be one, two, three, or more, for example. Although Microsoft® tools are given as examples herein, data sources 402 are not necessarily limited to Microsoft® tools. All trademarks in this paragraphs are marks of Microsoft Corporation.

In some embodiments, data storage and synchronization services 414 store the gathered events 224, and synchronize previously stored events with the data sources and with the profiles 336 according to default or user-specified criteria as to when events are harvested from sources, when events are posted to profiles, and when events are obsolesced so they are no longer posted to profiles 336.

In some embodiments, the private social network platform 228 includes a web portal 416, with components 418 such as a profile manager 230, news generator 222, and social connection manager 232. Some embodiments also include a collaboration engine 420, such as a Microsoft® Visual Studio® Team System tool suite or another collaborative IDE 130. Web services 422 based on familiar protocols and tools such as HTTP and XML coordinate servers running the components 418 with client machines. At a client site, the member interacts with the portal 416 through a web GUI, browser, or other web user interface 424.

In some embodiments, the process includes displaying 314 a suggested engineering activity 338 for the team member to perform as part of an engineering project of the engineering team. For example, the suggested engineering activity 338 may include following up 324 on a specification news item 214 by viewing a product specification 124, following up 324 on a specification news item 214 by creating a product test 122, following up 324 on a test execution news item 214 by viewing detailed test results, or following up 324 on a developer investigation news item 214 by creating a virtual machine session.

Some embodiments provide a member process for engineering project event-driven social networked collaboration, including logging into 318 a private network 108, accessing 320 a social network platform which is unavailable outside the private network, and viewing 322 engineering team news items on at least one of the following via the social network platform: an individual profile for a member of an engineering team, a team profile for the engineering team.

In some embodiments, the member follows up 324 on a viewed engineering team news item by performing 326 a computer-assisted engineering project task. In some, the member participates 328 in a real-time multidirectional communication session with at least one other member of the engineering team through the social network platform.

In some embodiments, team members satisfy 330 certain employment conditions (at least while accessing 320 and viewing 322 profiles 336); such a condition may be seen as a characteristic of the private social network platform 228. For instance, in some cases all members of the engineering team are employed by the same entity (company, government agency, joint venture, educational institution, etc.). In some cases, all product development members of the engineering team are employed by the same entity, and the engineering team further includes testing personnel employed by other entities which have confidentiality agreements with the product development entity.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable storage media (as opposed to wires and other propagated signal media). The storage medium which is configured may be in particular a removable storage medium 114 such as a CD, DVD, or flash memory. A general-purpose memory, which may be removable or not, and may be volatile or not, can be configured into an embodiment using items such as profiles 336, private social network platforms 228, and/or engineering news generators 222, in the form of data 118 and instructions 116, read from a removable medium 114 and/or another source such as a network connection, to form a configured medium. The configured medium 112 is capable of causing a computer system to perform process steps for transforming data through private event-driven engineering collaboration as disclosed herein. FIGS. 1 through 4 thus help illustrate configured storage media embodiments and process embodiments, as well as system and process embodiments. In particular, any of the process steps illustrated in FIG. 3 and/or FIG. 4, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific screen layouts, item syntax, specific data shown, specific APIs, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

Portions of this discussion are derived from prototype documentation and experience, for a prototype implemented by Microsoft Corporation. Aspects of the prototype and/or documentation are consistent with or otherwise illustrate aspects of the embodiments described herein. However, it will be understood that prototype documentation and/or implementation choices do not necessarily constrain the scope of such embodiments, and likewise that any prototype and/or its documentation may well contain features that lie outside the scope of such embodiments. It will also be understood that the discussion below is provided in part as an aid to readers who are not necessarily of ordinary skill in the art, and thus may contain and/or omit details whose recitation below is not strictly required to support the present disclosure.

Some traditional ways of collaboration in engineering include the usage of isolated tools and disconnected processes, which introduce significant overhead in communication and process follow-up. Some embodiments introduced here, however, apply social networking concepts to engineering activities to increase the collaboration efficiency.

In some embodiments, the platform 228 provides the following features.

Engineering news updates in the form of news 214 messages pushed to engineers which contain the real time work activities of their teammates.

Profile 336 pages including a summarized view 216 of an individual or a team, which contains real time data for the current engineer user to focus on.

Collaboration engine 420 actions in the form of action 338 links auto-suggested by the platform within news updates or profile page data fields, which permit a current user to follow the best practice of engineering processes through easy follow up 324 that brings in the appropriate computer assistance with single click.

By way of context for some embodiments, the following discussion provides a comparison of how typical engineering activities are done with traditional tools versus done with a platform 228.

To know what the teammates' are doing, some traditional engineering toolsets support checking emails in a mailbox; checking data in source control systems 132, checking data in file sharing tools 408, checking data in web publishing tools 410, and so on; and arranging status sync-up meetings. By contrast, a social network based collaboration platform 228 allows one to view 322 real time news updates from the connected team and teammates.

To know the overall status of the team, some traditional engineering toolsets support learning the best practice, the workflows, and the related tools, e.g., learning company procedures, preferences, and tool locations for code review, bug triage, and other engineering activities; syncing up with teammates on their work status by phone or email; and using various disconnected tools and collaboration efforts with teammates. By contrast, a social network based collaboration platform 228 allows one to simply view 322 the profile page 202 of the team.

To collaborate with teammates, some traditional engineering toolsets support checking emails in a mailbox; checking data in source control systems 132, checking data in file sharing tools 408, checking data in web publishing tools 410, and so on; and arranging status sync-up meetings. By contrast, a social network based collaboration platform 228 allows one to follow the news 214 updates, to click on the suggested action 338 items in the news and readily perform best follow-up practice tool 126 interaction in one place.

A prototype platform 228 was targeted at software engineering teams, and deployed within a ConfigMgr test team, as a one-stop portal 416 for daily work, serving over a hundred users (about half fulltime employees, about half contractors). The portal 416 was accessed through a private network URL, provided social network based features, a news 214 feed of Dev/Test/PM activities, collaboration actions 338 on bug/case management, on resource management, and on process follow-up, as well as personalized profiles 202, 204 including test metrics and work item prioritization 220. Real time sync services 414 collected updates from various sources 402 and kept data storage up-to-date. Test Portal social components managed engineering data and implemented the workflow logic. The portal implementation provided low level APIs for web services 422 with functionality based on the features discussed herein; Test Portal web services facilitated a UI layer for the social networking features.

Figure 5:
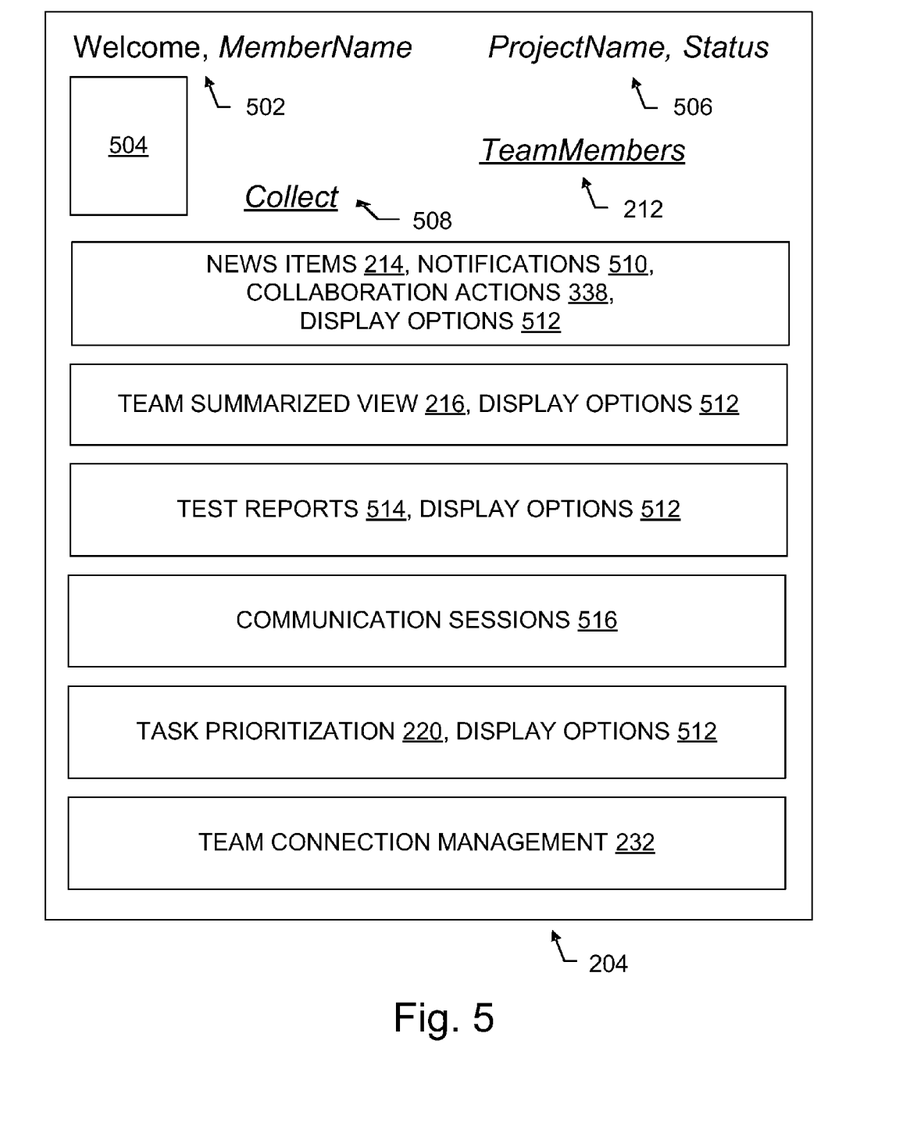
FIG. 5 is a user interface diagram illustrating a profile in a private social network platform for facilitating collaboration driven by events in an engineering project.

FIG. 5 illustrates a test portal profile 204. A greeting 502 welcomes the user and identifies 206 the user by name 208. A photo 504 of the profiled user also helps identify the user to other team members who view the profile 204. A schedule update 506 identifies the team's project by name and current status, e.g., showing the number of days completed and the number of days remaining to the next milestone or the completion date of the project. A direct link is provided to other members' profiles 204, possibly via a team profile 202. A news collection button 508 prompts the system to collect 302 and display 310 updates.

In the illustrated implementation, news items 214 included notifications 510, e.g., with descriptions such as "7/30/2010: You can now visit others' profile by the 'team members' link", "You have 1 BVT bug assigned: 233741", "You have 84 FEC cases not marked for this TP: 228565, 228864, 228866, 228867, 228868 . . . " Real-time news items 214 included items of the form "<time> <role/contact alias, e.g., '@Admin', '@Metering', etc.>, <offline name> <employer if not Microsoft Corporation>modified <count> bugs : <bug ID list, e.g., '2300845'>" "more updates <hyperlink to more items 214>".

In the illustrated implementation, links to teammates were provided with accompanying photos (or stand-in images) 504 of the respective team members.

In the illustrated implementation, collaboration actions 338 were embedded in news items as hyperlinks. For instance, one could follow up 324 on a specification update from a Project Manager or Program Manager by viewing the specification 124 and/or creating tests, in response to a news item description having the form "<time>#wiki <member name 208> updated a wiki article <wiki article title and hyperlink to wiki>[<'create tests' link to tool 126 for creating test suites 122>]". Similarly, one could follow up 324 test pass execution update news 214 from test team members to view case detail in response to a news item having similar syntax, with the event time, team member name, bug/result identifier, and a phrase such as "filed 2 results" or "created 3 cases". Similarly, one could follow up 324 a news time "got 2 bugs to investigate" on investigation requests from a developer to create a virtual machine session using a hyperlink to a virtual machine management tool 412, 126 labeled "create session".

In the illustrated implementation, team connection management through a social connection manager 232 allowed members to be placed in groups and/or placed on buddy lists.

In the illustrated implementation, display options 512 were provided, allowing users to select data filtering options such as "owned by me", "owned by team", "assigned to me", and so on. An individual profile 204 included in a test reports section 514 a test pass section graphically and textually summarizing tests passed and failed, associated bugs, and the like, with a link to more data. An individual profile 204 also included in section 514 a test cases section graphically and textually summarizing test cases, with draft, manual, automated, and similar categories, handoff information, and the like. An individual profile 204 also included a bugs section graphically and textually summarizing bugs, with fixed, buddy test, investigate, active, resolved and similar categories. An individual profile 204 also included a sessions section 516 graphically and textually summarizing communication sessions, with session destination, session status, and options to create a session, check resources, refresh, link to another private network, or file a ticket. A task prioritization section 220 includes a list of vendor tasks, with bug/tack IDs, team member IDs, status notes regarding handoff and results, and links to issue tracking tools 134.

A team profile 202 contained similar information to that noted above, with the team leader's photo 504 and name 208, and a link 212 to team members profiles and a link to a team summary view 216 of test pass, test case, and bugs information. A link to the team leader's individual profile 204 was also given.

Conclusion

Although particular embodiments are expressly illustrated and described herein as processes, as configured media, or as systems, it will be appreciated that discussion of one type of embodiment also generally extends to other embodiment types. For instance, the descriptions of processes in connection with FIGS. 3 and 4 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A process for engineering project event-driven social networked collaboration, the process comprising:
    logging into a private network;
    accessing a social network platform which is unavailable outside the private network; and
    viewing engineering team news items, generated by a news generator which collects engineering events from engineering data sources, on at least one of the following profiles via the social network platform: an individual profile for a member of an engineering team, a team profile for the engineering team, wherein the engineering data sources include at least three of the following: a network administration database, a software source control system, a project issue tracking tool, a test case management tool, a file sharing tool, a web publishing tool, or a virtual machine management tool; and
    viewing a suggestion for at least one of the following engineering activities:
        following up on a news item by viewing a product specification;
        following up on a news item by creating a product test;
        following up on a news item by creating a virtual machine session;
    wherein all product development members of the engineering team are employed by the same entity, and the engineering team further includes testing personnel employed by other entities which have confidentiality agreements with the product development entity.

2. The process of claim 1, further comprising following up on a viewed engineering team news item by performing a computer-assisted engineering project task.

3. The process of claim 1, further comprising participating in a real-time multidirectional communication session with at least one other member of the engineering team through the social network platform.

4. The process of claim 1, wherein viewing engineering team news items comprises viewing a team profile for the engineering team.

5. The process of claim 1, wherein the viewing step comprises viewing news which identifies another member of the engineering team by offline name and by employer.

6. The process of claim 1, further comprising viewing engineering event information collected from at least four of the following:
    a network administration database;
    a software source control system;
    a project issue tracking tool;
    a test case management tool;
    a file sharing tool;
    a web publishing tool; or
    a virtual machine management tool.

7. A computer system comprising:
    a logical processor;
    a memory in operable communication with the logical processor;
    a member profile residing in the memory, the member profile having an identification of a member of an engineering team, at least one direct link to member profile (s) of other member(s) of the engineering team, automatically generated news items of engineering activities performed by members of the engineering team, and a summarized view of engineering project data which was collected from a plurality of data sources and summarized for the engineering team, wherein all product development members of the engineering team are employed by the same entity, and the engineering team further includes testing personnel employed by other entities which have confidentiality agreements with the product development entity;

a team profile for the engineering team, the team profile residing in the memory and containing a team leader photograph and a team leader name; and a news generator which collects engineering events from at least three of the following engineering data sources for viewing news derived therefrom, and makes corresponding event descriptions available for inclusion in at least one profile: a network administration database, a software source control system, a project issue tracking tool, a test case management tool, a file sharing tool, a web publishing tool, or a virtual machine management tool.

8. The system of claim 7, wherein the identification of a member of an engineering team comprises an offline name of the team member, that is, a name which is used by the team member in social interactions offline with people who are not members of the engineering team.

9. The system of claim 7, wherein the news items comprise personalized real time news items of engineering activities of the engineering team which comprise at least one of the following:
   a project schedule update for an engineering project of the engineering team;
   a notification regarding an engineering task assigned to the team member;
   software modification event updates for a software engineering project of the engineering team.

10. The system of claim 7, wherein the news items comprise a suggested engineering activity for the team member to perform as part of an engineering project of the engineering team.

11. The system of claim 7, wherein the profiles comprise a test report describing engineering test activity for an engineering project of the engineering team.

12. The system of claim 7, wherein the profiles comprise a personalized engineering task prioritization for engineering tasks of the team member in an engineering project of the engineering team.

13. The system of claim 7, wherein the memory further contains at least one of the following:
   a wiki article update;
   a software bug report;
   a software modification; or
   a project schedule change.

14. A computer-readable storage memory configured with data and with instructions that when executed by at least one processor causes the processor(s) to perform a process for engineering project event-driven social networked collaboration, the process comprising the steps of:
   collecting engineering events from at least three of the following engineering data sources for viewing news derived therefrom by a news generator: a network administration database, a software source control system, a project issue tracking tool, a test case management tool, a file sharing tool, a web publishing tool, or a virtual machine management tool; and displaying a profile, which includes displaying an offline name of a member of an engineering team, displaying direct links to profiles of other members of the engineering team, and displaying personalized news items based on collected engineering events, wherein all product development members of the engineering team are employed by the same entity, and the engineering team further includes testing personnel employed by other entities which have confidentiality agreements with the product development entity;

displaying a summarized view of engineering project data for the engineering team, the engineering project data having been collected from a plurality of data sources and pertaining to a particular engineering project of the engineering team; and displaying a project schedule update for the particular engineering project.

15. The computer-readable storage memory of claim 14, wherein the collecting step collects engineering events of at least two of the following kinds:
   wiki article updates;
   software bug reports;
   software modifications;
   project schedule changes.

16. The computer-readable storage memory of claim 14, wherein the collecting step collects engineering events from at least two of the following sources:
   a network administration database;
   a software source control system;
   a project issue tracking tool;
   a test case management tool;
   a file sharing tool;
   a web publishing tool;
   a virtual machine management tool.

17. The computer-readable storage memory of claim 16, wherein the collecting step collects engineering events from at least three of the sources.

18. The computer-readable storage memory of claim 14, further comprising displaying a suggested engineering activity for the team member to perform as part of an engineering project of the engineering team.

19. The computer-readable storage memory of claim 18, wherein the suggested engineering activity includes at least one of the following:
   following up on a specification news item by viewing a product specification;
   following up on a specification news item by creating a product test;
   following up on a test execution news item by viewing detailed test results;
   following up on a developer investigation news item by creating a virtual machine session.

20. The computer-readable storage memory of claim 14, further comprising displaying at least one of the following:
   a notification regarding an engineering task assigned to the team member;
   a software modification event update for a software engineering project of the engineering team;
   a social connection manager for managing engineering team member connections.

* * * * *